A. Whiteley,
Harvester Cutter.
No 14428
Patented. Mar. 11. 1856
Fig. 1.
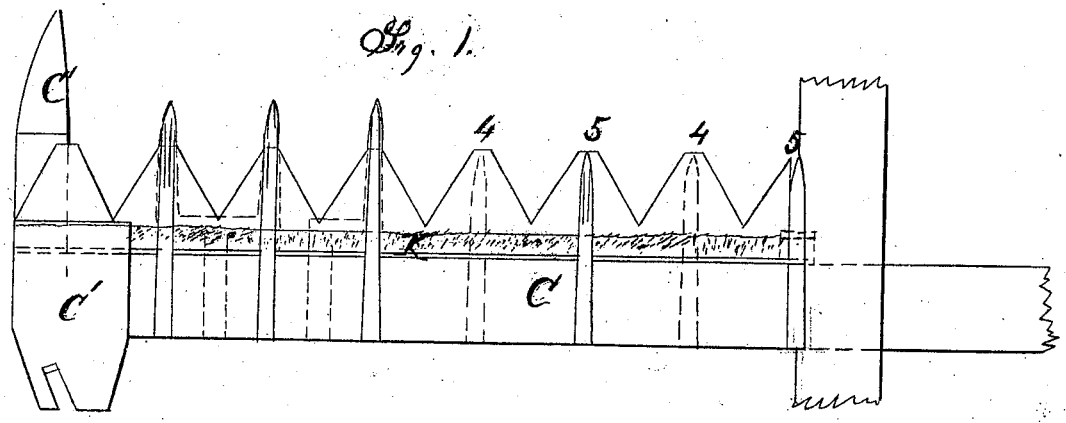
Fig. 2.
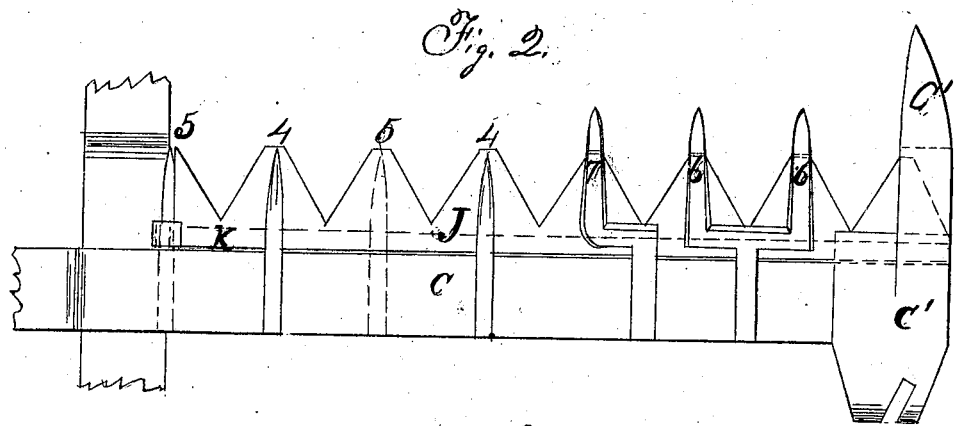
Fig. 3.
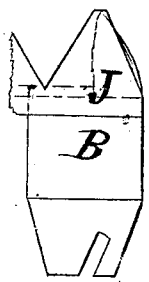
Fig. 4
Fig. 5
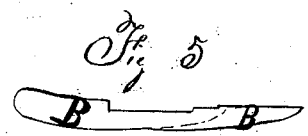
Abner Whiteley

UNITED STATES PATENT OFFICE.

ABNER WHITELEY, OF SPRINGFIELD, OHIO.

IMPROVEMENT IN GRAIN AND GRASS HARVESTERS.

Specification forming part of Letters Patent No. 14,428, dated March 11, 1856.

*To all whom it may concern:*

Be it known that I, ABNER WHITELEY, of Springfield, in the county of Clarke and State of Ohio, have invented new and useful Improvements in Grain and Grass Harvesters; and I do hereby declare that the following is a full, clear, and exact description of the same, reference being had to the annexed drawings, forming part of this specification.

In constructing my machine I make the tops or caps of the guards wider than the lower portions of the same, and so wide as to permit any gravel or small stones that may come into the cut to drop out of the cut without being brought against or supported by the lower part of the guard. Thus I avoid injuring the cutters and preserve a good edge; and to prevent clogging, and at the same time give strength to the cap or top of the guard, I make the caps double—*i. e.*, I connect the rear ends of two caps by a solid metal connection. The part forming said connection is so situated as to have its front edge extend over the rear of the cut and its rear edge situated forward of the finger-piece, to which it is attached by a portion of said part extending backward from the center of its rear edge, or so nearly so that the rear corners of the cut shall not pass beyond said part when vibrated—*i. e.*, that the same blade never passes entirely from under it to the finger-piece, and thence far enough into or on top of the finger-piece to permit it to be securely fastened to it, thus supporting the rear ends of the caps firmly, while at the same time any straws or blades of grass or grain which may be carried through the slot by the blades are permitted to pass freely backward on one side of the guard, while that on the other side is held in its place until it is cut out by the rear portion of the cut. When made single the caps serve the same purpose and correspond with the double caps, having one side cut off; and, further, to improve the cutting, prevent clogging the cutter in the shoe or divider and make the machine more easily drawn, decrease side draft, and prevent dragging down a strip of grass or grain which is not cut, I make that part of the shoe which receives the end of the finger-piece in the usual manner, which is a little wider than the space through which the end of the cutter-bar is vibrated. This is made of the same width as far forward as the front edge of the cutter-bar, and furnished with a groove to receive the cutter-bar with the cutter-blades on. (This groove and the short cutter which I now use are the same as are secured to me by a former patent.) Now, from the front edge of the cutter-bar forward the shoe is about half the width of the rear, and permits the end of the cutter to play out of and return into the divider in the groove, (in the manner described in a former specification;) and instead of furnishing said shoe with a slot, as is usually done, I remove that portion of the shoe which forms the under part of said slot and cause the cutter to cut against the top part, which forms the top of said slot, in the same manner as it does against my alternately-placed side fingers, and thereby permit any grass carried into the shoe by the end of the cutter to drop out when the end of the cutter is withdrawn. The same may be accomplished to some extent by removing the upper portion instead of the lower. Thus the shoe is only half the width of the common shoe, and consequently requires less power to draw it through the grass, and drags down less grass. (This narrow divider is the same in principle as that shown in one of my former patents, that being shown there for reaping and this being for mowing.) And to again further avoid clogging I make the side of the cutter-bar opposite the one on which the blades are fastened a rasp, having the points of the rasping so set as to pull or push out any straws or blades which may work back under the cutter-bar. I also make a part or all of the front edge of the bar a rasp or rough edge, and to prevent the points of the finger or fingers next the coupling-box or any other of them carrying grass on them I terminate the points at or near the points of the blades, so as to permit the blades, when vibrated, to cut any grass that gets on them off.

In the drawings, C is the shoe or divider. J is the cutter. K is the cutter-bar, which is made a rasp, as described. 4 4 are upper side fingers, and 5 5 are the opposite, and are alternately placed with 4 4, and having their points terminate at the points of the blades. B is another form of the shoe, having its front point terminate at the point of the blade which cuts against it, and having no top, but is cut against in the same manner as the side fingers, 5 5. 6 6 is a double cap or top of two guards, and have their edges extending over the edges of the bottom portion of the same. 7 is a single one, made similar to the double one.

Having described my improvements, what I claim as my invention, and desire to secure by Letters Patent, is—

1. The narrow divider, as described, and for the purposes set forth.

2. Making the divider with that portion forming the under or upper side of the slot removed, as the case may be, as set forth.

3. Terminating the shoe B at or near the point of the blade which cuts against it to prevent it carrying grass.

4. Extending of the tops of the guards over the edges of the lower portions, as described, and for the purposes set forth.

5. The double cap 6 6, as described—i. e., the caps of two guards in one piece, having one shank for attaching it to the finger-piece; but I do not claim one cap having two shanks for attachment.

6. Attaching the shanks of the guard-caps to the finger-piece, as described, for the purpose of preventing straws or blades being carried beyond them to cause clogging.

7. Terminating the points of the finger or fingers at or near the points of the blades, for the purposes set forth.

8. Making one side and also one edge of the cutter-bar, or either of them, a rasp or rough surface, as described, and as set forth.

In testimony whereof I have signed my name before two subscribing witnesses.

ABNER WHITELEY.

Witnesses:
JOHN L. SMITH,
J. F. WOLLARD.